(12) United States Patent
Goldfarb et al.

(10) Patent No.: US 10,788,133 B2
(45) Date of Patent: Sep. 29, 2020

(54) SPOOL AND BODY ARCHITECTURES FOR THREE-POSITION DIRECTIONAL CONTROL VALVES

(71) Applicant: VANDERBILT UNIVERSITY, Nashville, TN (US)

(72) Inventors: Michael Goldfarb, Nashville, TN (US); Jason Mitchell, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 103 days.

(21) Appl. No.: 15/794,074

(22) Filed: Oct. 26, 2017

(65) Prior Publication Data

US 2018/0106386 A1 Apr. 19, 2018

Related U.S. Application Data

(62) Division of application No. 14/758,302, filed as application No. PCT/US2013/078430 on Dec. 31, 2013, now Pat. No. 9,803,758.

(Continued)

(51) Int. Cl.
| | |
|---|---|
| *F16K 11/07* | (2006.01) |
| *F16K 31/06* | (2006.01) |
| *F15B 13/04* | (2006.01) |

(52) U.S. Cl.
CPC .......... *F16K 11/07* (2013.01); *F16K 31/0613* (2013.01); *F15B 13/0402* (2013.01); *F15B 2013/0412* (2013.01)

(58) Field of Classification Search
CPC .. F16K 31/0613; F16K 11/07; F15B 13/0402; F15B 2013/0412

(Continued)

(56) References Cited

U.S. PATENT DOCUMENTS 3,805,670 A * 4/1974 Fallows, Jr. ........ F15B 13/0402
                                                          91/378
5,992,294 A    11/1999 Seddon

FOREIGN PATENT DOCUMENTS

| CN | 102116328 | 7/2011 |
|---|---|---|
| CN | 102734546 | 10/2012 |

(Continued)

OTHER PUBLICATIONS

Giesen, "[Energy-Savings Pneumatics: opportunities in control technology for reducing the consumption in linear drives]", *Fluid*, Jun. 1982, pp. 36-39. German.

(Continued)

*Primary Examiner* — Paul J Gray
(74) *Attorney, Agent, or Firm* — Parker Highlander PLLC

(57) ABSTRACT

A directional-control valve is typically comprised of a valve spool that slides linearly within a valve body. The valve body typically includes five internal ports, which are covered or exposed as the spool slides within the body. The typical five-internal-port architecture precludes certain combinations of port connectivity when the spool is in the center position. For example, when the spool is in the center position, providing connectivity between the actuator ports, while simultaneously providing fluid isolation of the supply and exhaust ports, is not directly achievable with a standard five-port architecture. This application describes three embodiments that enable the aforementioned port connectivity when the spool is in the center position.

6 Claims, 9 Drawing Sheets

Related U.S. Application Data

(60) Provisional application No. 61/747,497, filed on Dec. 31, 2012.

(58) Field of Classification Search
USPC .................................... 137/625.67, 625.69
See application file for complete search history.

(56) References Cited

FOREIGN PATENT DOCUMENTS

| | | |
|---|---|---|
| DE | 102 47 967 | 2/2004 |
| DE | 102010009085 | 3/2011 |
| DE | 10 2009 057807 | 6/2011 |
| DE | 102010032118 | 1/2012 |
| DE | 10 2010 062663 | 6/2012 |
| EP | 0117209 | 8/1984 |
| EP | 0 879 979 | 11/1998 |
| WO | WO 80/01940 | 9/1980 |

OTHER PUBLICATIONS

Giesen, "[Energy-Savings Pneumatics: opportunities in control technology for reducing the consumption in linear drives]", *Fluid*, Jun. 1982. English Translation.

International Preliminary Report on Patentability issued in International Application No. PCT/US2013/078430, dated Jul. 9, 2015.

International Search Report and Written Opinion issued in International Application No. PCT/US2013/078430, dated Apr. 16, 2014.

Office Action and Search Report issued in corresponding Chinese application 201380068108.8, dated Oct. 9, 2016.

Office Communication issued in corresponding European application 13824724.2, dated Sep. 14, 2017.

\* cited by examiner

SPOOL AND BODY ARCHITECTURES FOR THREE-POSITION DIRECTIONAL CONTROL VALVES

CROSS REFERENCE TO RELATED APPLICATIONS

This application is a divisional of U.S. application Ser. No. 14/758,302, filed Jun. 29, 2015, as a national phase application under 35 U.S.C. § 371 of International Application No. PCT/US2013/078430, filed Dec. 31, 2013, which claims priority to U.S. Provisional Patent Application Ser. No. 61/747,497, filed Dec. 31, 2012, the contents of each of which are incorporated by reference herein.

This invention was made with government support under grant number IIP1214865 awarded by the National Science Foundation. The government has certain rights in the invention.

TECHNICAL FIELD

The present disclosure relates generally to directional control valves. The present disclosure relates more specifically to spool and body geometric configurations of three-position directional control valves.

BACKGROUND INFORMATION

Typical directional control valves utilize a binary-type fluid power positioning system in which the directional control valve is directed to one of two or three positions. In many existing two-position valves, the directional control valve is coupled to an actuator assembly with a double-acting piston. When the directional control valves is in the first position, air (or other fluid) is directed to one side of the piston, while air on the second (opposite) side of the piston is vented to atmosphere. When the directional control valve is in the second position, air is directed to the second side of the piston, and air on the first side of the piston is vented to atmosphere.

In some embodiments of a directional control valve, the valve includes a third position of the spool within the valve body, which is physically located between the first and second positions of the spool relative to the valve body. The third position is characterized by a different type of fluid connectivity relative to the first and second positions. For example, in the third position, all inlet and actuator ports might be isolated (i.e., none of the four ports are in fluid communication with each other), or both actuator ports might be connected to an exhaust port.

A directional control valve is typically implemented by a first body (typically called the spool) that slides linearly within a second body (typically called the valve body). The valve body includes a series of external ports, which are either isolated from fluid communication, or exposed to fluid communication with adjacent ports by the geometry of the spool. FIG. 1 shows a schematic of a conventional two-position valve spool and body geometry. In the figure, the inlet port is represented by S (supply), and the exhaust ports represented by E (exhaust), while the first and second actuator ports are represented by A and B, respectively. Note that, as shown in the figure, the exhaust port is typically separated into two geometrically distinct ports, which facilitates the reciprocal fluid connectivity between exhaust and actuator ports that characterizes a directional control valve. That is, since the spool can only expose fluid communication between adjacent internal ports, and since the two positions provide reciprocal connectivity between the exhaust and actuator ports, each actuator port must be adjacent to each exhaust port. Further, since the connectivity in the first and second valve positions is reciprocal, the ports must also be arranged in an anti-symmetric manner, such that sliding the spool from the first to the second position will reciprocally connect the respective supply, exhaust and actuator ports. That is, if the supply and exhaust ports are positioned to the right and left, respectively, of the first actuator port, then the supply and exhaust ports must be positioned to the left and right, respectively, of the second actuator port. Thus, one can deduce that the geometric conditions required to provide the reciprocal connectivity of a directional control valve are adjacency (i.e., a supply and exhaust port must be adjacent to each actuator port) and anti-symmetry (i.e., the geometric configuration of supply and exhaust ports relative to the first actuator port must be mirrored with respect to the second actuator port). As a result of these geometric conditions, the standard architecture of a directional control valve is embodied by a 5-port architecture, as shown in FIG. 1. This architecture can be referred to as a 5-port geometry, since the valve body contains five internal and external ports, where the exhaust port is associated with two physical ports (i.e., the five physical ports in the valve body are associated with four distinct fluid pressures). As shown in the figure, when the valve spool is in the first position (P1), the inlet port (S) is in fluid communication with the first actuator port (A), and the exhaust port (E) is in fluid communication with the second actuator port (B). When the valve spool slides to the second position (P2), the inlet port (S) is in fluid communication with the second actuator port (B), and the exhaust port (E) is in fluid communication with the first actuator port (A). These are the two fundamental positions of a directional control valve.

As previously mentioned, a third position can be introduced between the first and second positions of the valve spool. The three standard configurations of port connectivity for the third position are shown schematically in FIGS. 2 through 4. Specifically, FIG. 2 shows a third position configuration in which all ports are isolated; FIG. 3 shows a third position configuration in which the inlet port is connected to both actuator ports (and the exhaust port is isolated); and FIG. 4 shows a third position configuration in which the exhaust port is connected to both actuator ports (and the inlet port is isolated). Note that implementation of these three variations require essentially no substantially changes in the directional control valve architecture relative to the basic two-position architecture. Specifically, as shown in FIG. 2, the first variation (all ports isolated) requires no changes in valve spool or body geometry, relative to the two-position spool and body. As shown in FIG. 3, the connectivity in which the inlet port is connected to both actuator ports requires only minor variations to the spool geometry, and in particular, requires that the center lobe on the valve spool be narrower than the nominal spool geometry. Finally, as shown in FIG. 4, the connectivity in which the exhaust port is connected to both actuator ports requires that the two outer lobes of the valve spool be narrower than the nominal spool geometry. Thus, the third-position functionality embodied in prior art is enabled by minor variations on the nominal valve geometry (and specifically requires either no changes or slight changes in the spool geometry).

In some applications, it may be desirable for the third-position behavior that provides fluid communication between the two actuator ports and simultaneous fluid isolation of the inlet and exhaust ports. This application describes some valve spool and body configurations that provide this third-position behavior.

SUMMARY

Exemplary embodiments described herein include apparatus and methods related to a directional control valve with a first and second position connectivity characteristic of a standard directional control valve, but with a third-position connectivity characterized by fluid communication between the two actuator ports and fluid isolation of the inlet and exhaust ports. Exemplary embodiments described herein include three architectures for providing this functionality. Rather than the 5 internal ports embodied by the standard valve spool and body interface, the embodiments described here include 7, 8, and 9 internal ports, respectively (i.e., where an internal port is one that can either be isolated or exposed by the spool geometry). These three embodiments are referred to as 7-port, 8-port, and 9-port designs, respectively.

Certain embodiments comprise a directional-control valve including a valve spool within a valve body, where the valve spool is configured to move within the valve body between a first position, a second position and a third position; and the third valve spool position lies between the first and the second valve spool positions. In particular embodiments, the valve body comprises five external ports arranged between a first end of the valve body and a second end of the valve body, comprising a first exhaust port, a first actuator port, an inlet port, a second actuator port, and a second exhaust port. Specific embodiments also comprise seven internal ports arranged between a first end of the valve body and a second end of the valve body, where the seven internal ports are in fluid communication with the five external ports in the following order along the valve body: the first exhaust port, the first actuator port, the inlet port, the second actuator port, the second exhaust port, the second actuator port and the first actuator port.

In particular embodiments, the second and seventh internal ports, and the fourth and sixth internal ports, respectively, are in fluid communication. In certain embodiments, the second and sixth internal ports, and the fourth and seventh internal ports, are in fluid communication, respectively. In specific embodiments, the valve spool includes a first, second, third, and fourth lobe, and in 4, where the first, second, third and fourth lobes are arranged in an asymmetric manner along the length of the spool.

In certain embodiments, in the first spool position, the first and second internal ports proximal to the first end of the valve body maintain fluid communication between the first and second lobes of the spool; the third and fourth internal ports maintain fluid communication between the second and third lobes of the spool; the fifth internal port is isolated from fluid communication by the third lobe of the spool; and the seventh internal port is isolated by the fourth lobe of the spool.

In specific embodiments, in the second spool position, the first internal port is isolated from fluid communication by the first lobe of the spool; the second and third internal ports maintain fluid communication between the first and second lobes of the spool; the fourth and fifth internal ports maintain fluid communication between the second and third lobes of the spool; and the sixth internal port is isolated from fluid communication by the third lobe of the spool.

In particular embodiments, in the third spool position, the first internal port is isolated from fluid communication by the first lobe of the spool; the third internal port is isolated from fluid communication by the second lobe of the spool; the fifth internal port is isolated from fluid communication by the third lobe of the spool; and the sixth and seventh internal ports maintain fluid communication between the third and fourth lobes of the spool.

Certain embodiments comprise a directional-control valve including a valve spool within a valve body, where: the valve spool is configured to move within the valve body between a first position, a second position and a third position; and the third valve spool position lies between the first and the second valve spool positions. In certain embodiments, the valve body comprises: five external ports arranged between a first end of the valve body and a second end of the valve body, comprising a first exhaust port, a first actuator port, an inlet port, a second actuator port, and a second exhaust port.

Specific embodiments further comprise eight internal ports arranged between a first end of the valve body and a second end of the valve body, and where the eight internal ports are in fluid communication with the five external ports in the following order along the valve body: the first exhaust port, the first actuator port, the inlet port, the first actuator port, the second actuator port, the inlet port, the second actuator port and the second exhaust port.

In certain embodiments, the second and fourth internal ports, and the fifth and seventh internal ports, respectively, are in fluid communication. In specific embodiments the valve spool includes a first, second, third, and fourth lobe. In certain embodiments, the first, second, third, and fourth lobes are arranged in a symmetric manner along the length of the spool. With specific embodiments in the first spool position, internal ports 1 and 2 maintain fluid communication between the first and second lobes of the spool; internal port 3 is isolated from fluid communication by the second lobe of the spool; internal port 5 is isolated from fluid communication by the third lobe of the spool; internal ports 6 and 7 maintain fluid communication between the third and fourth lobes of the spool; and internal port 8 is isolated from fluid communication by the fourth lobe of the spool.

With certain embodiments in the second spool position, internal port 1 is isolated from fluid communication by the first lobe of the spool; internal ports 2 and 3 maintain fluid communication between the first and second lobes of the spool; internal port 4 is isolated from fluid communication by the second lobe of the spool; internal port 6 is isolated from fluid communication by the third lobe of the spool; and internal ports 7 and 8 maintain fluid communication between the third and fourth lobes of the spool.

With particular embodiments in the third spool position, internal port 1 is isolated from fluid communication by the first lobe of the spool; internal port 3 is isolated from fluid communication by the second lobe of the spool; internal port 6 is isolated from fluid communication by the third lobe of the spool; internal port 8 is isolated from fluid communication by the fourth lobe of the spool; and internal ports 4 and 5 maintain fluid communication between the second and third lobes of the spool.

Particular embodiments include directional-control valve comprising a valve spool within a valve body, where: the valve spool is configured to move within the valve body between a first position, a second position and a third position; and the third valve spool position lies between the first and the second valve spool positions. In certain embodiments, the valve body comprises: five external ports arranged between a first end of the valve body and a second end of the valve body, comprising a first exhaust port, a first actuator port, an inlet port, a second actuator port, and a second exhaust port; and nine internal ports arranged between a first end of the valve body and a second end of the valve body, and where the nine internal ports are in fluid communication with the five external ports in the following order along the valve body: the first exhaust port, the first actuator port, the first actuator port, the first actuator port, the inlet port, the second actuator port, the second actuator port, the second actuator port, the second exhaust port.

In certain embodiments, the third and seventh internal ports, second and fourth internal ports, and the sixth and eighth internal ports, respectively, are in fluid communication. In particular embodiments, the valve spool includes a first, second, and third lobe. In specific embodiments, the first, second and third lobes are arranged in a symmetric manner along the length of the spool.

In certain embodiments in the first spool position, the first and second internal ports maintain fluid communication between the first and second lobes of the spool; the third and fourth internal ports are respectively isolated from fluid communication by the second lobe of the spool; the fifth and sixth internal ports maintain fluid communication between the second and third lobes of the spool; and the seventh, eighth, and ninth internal ports are respectively isolated from fluid communication by the third lobe of the spool.

In certain embodiments, in the second spool position, the first, second and third internal ports are respectively isolated from fluid communication by the first lobe of the spool; the fourth and fifth internal ports maintain fluid communication between the first and second lobes of the spool; the sixth and seventh internal ports are respectively isolated from fluid communication by the second lobe of the spool; and the eighth and ninth internal ports maintain fluid communication between the second and third lobes of the spool.

In particular embodiments, in the third spool position, the first and second internal ports are respectively isolated from fluid communication by the first lobe of the spool; the third and fourth internal ports maintain fluid communication between the first and second lobes of the spool; the fifth internal port is isolated from fluid communication by the second lobe of the spool; the sixth and seventh internal ports maintain fluid communication between the second and third lobes of the spool; and the eighth and ninth internal ports are respectively isolated from fluid communication by the third lobe of the spool.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
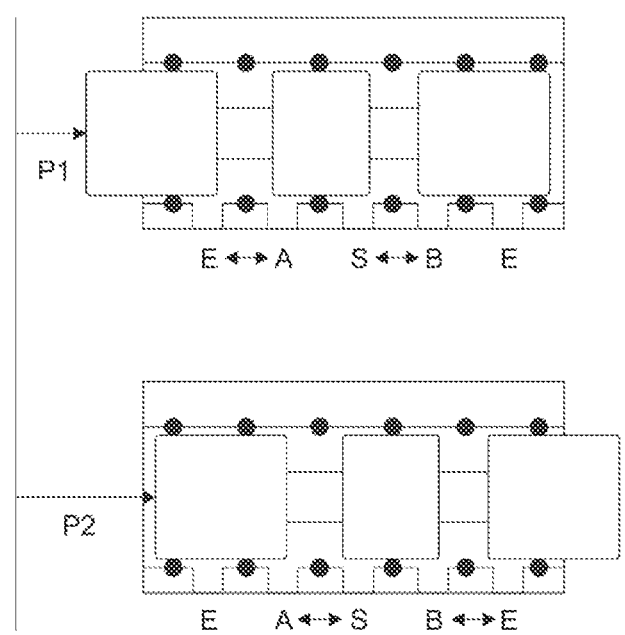
FIG. 1 depicts valve spool and body architecture for a two-position directional control valve. P1 and P2 represent the first and second positions of the spool. The inlet and the exhaust ports are represented by S and E (supply and exhaust) respectively, while the first and second actuator ports are represented by B and A, respectively.
Figure 2:
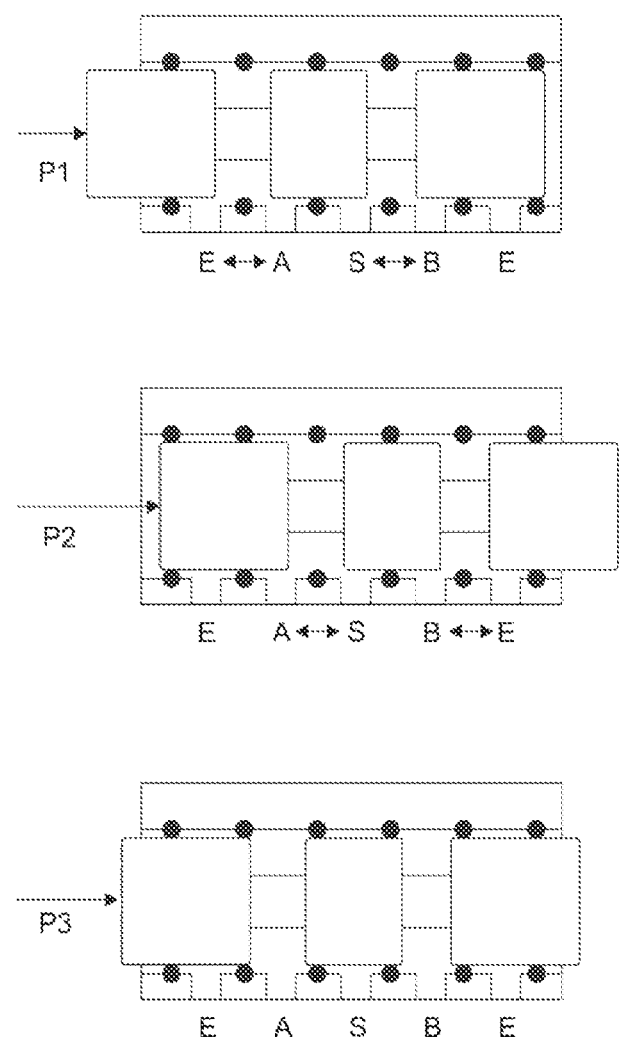
FIG. 2 depicts valve spool and body architecture for a three-position directional control valve, where the third position isolates all ports.
Figure 3:
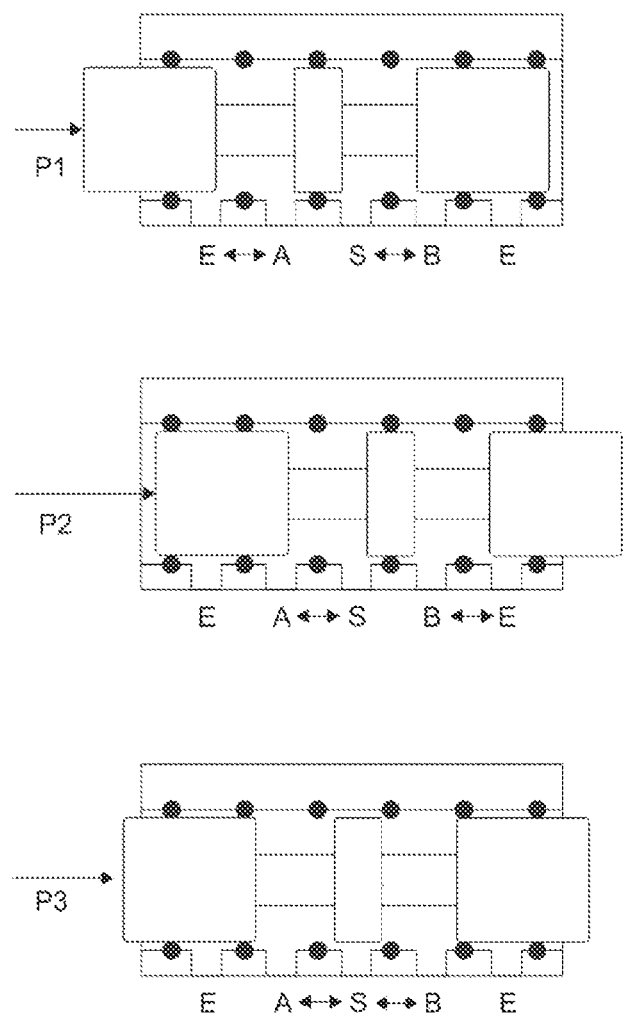
FIG. 3 depicts valve spool and body architecture for a three-position directional control valve, where the third position connects the inlet port (S) to both actuator ports (A and B), and isolates the exhaust port (E).
Figure 4:
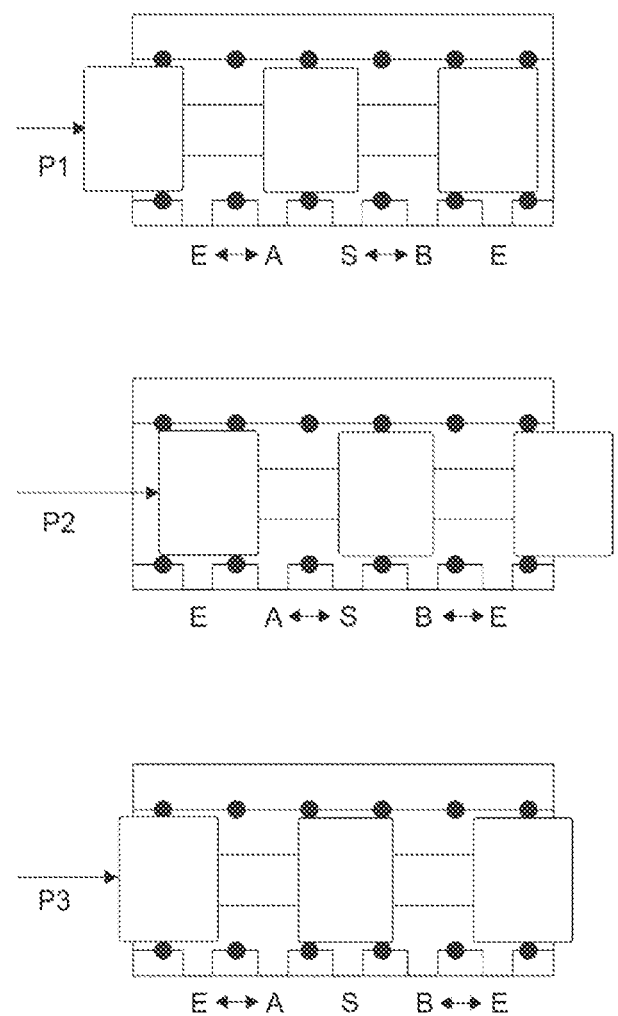
FIG. 4 depicts valve spool and body architecture for a three-position directional control valve, where the third position connects the exhaust port (E) to both actuator ports (A and B), and isolates the inlet port (S).
Figure 5:
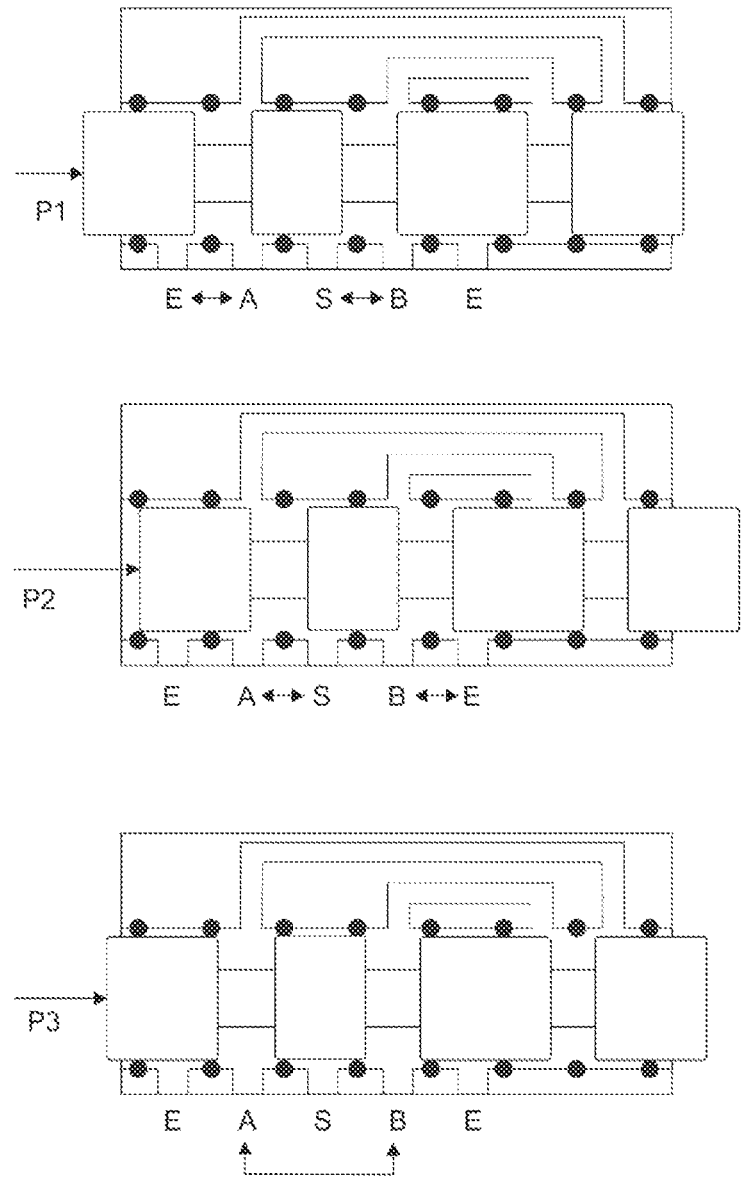
FIG. 5 depicts valve spool and body architecture for 7-port architecture of three-position directional control valve, where the third position connects exclusively both actuator ports (A and B), and isolates respectively the inlet and the exhaust ports (S and E).
Figure 6:
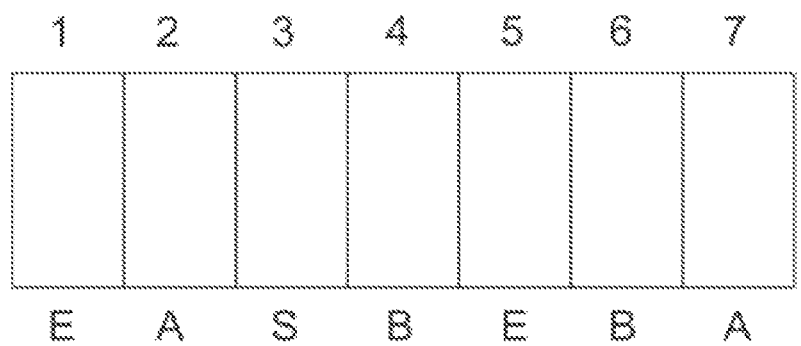
FIG. 6 depicts a schematic illustration of internal port configuration in 7-port valve design, showing the internal port number, along with the external port with which each internal port is associated.

DETAILED DESCRIPTION OF EXEMPLARY EMBODIMENTS 7-port Directional Control Valve Design A schematic of the 7-port directional control design is shown in FIG. 5. Note that the design includes 7 internal ports, as labeled in FIG. 6, arranged in the following order: exhaust port (E), first actuator port (A), inlet port (S), second actuator port (B), exhaust port (E), second actuator port (B), and first actuator port (A). Note that the ordering of the last two ports is not unique (i.e., the order of the last two ports can be switched). This valve configuration essentially incorporates the internal port arrangement of the standard 5-port valve body, and supplements it with two additional internal ports, which are the two actuator ports adjacent to each other. Given this port structure, the four-lobe valve spool shown (as opposed to the symmetric three-lobe spool in the standard configuration) can be incorporated into the valve body to provide the three-position connectivity previously described. The three spool positions corresponding to the first, second, and third valve positions are shown in FIG. 5, indicated in the figure as P1, P2, and P3 respectively. In order to maintain external port compatibility with the conventional 5-port design, internal flow paths can be introduced between second and seventh internal ports 2 and 7, and internal ports 4 and 6, as shown in FIG. 5.

8-port Directional Control Valve Design

Figure 7:
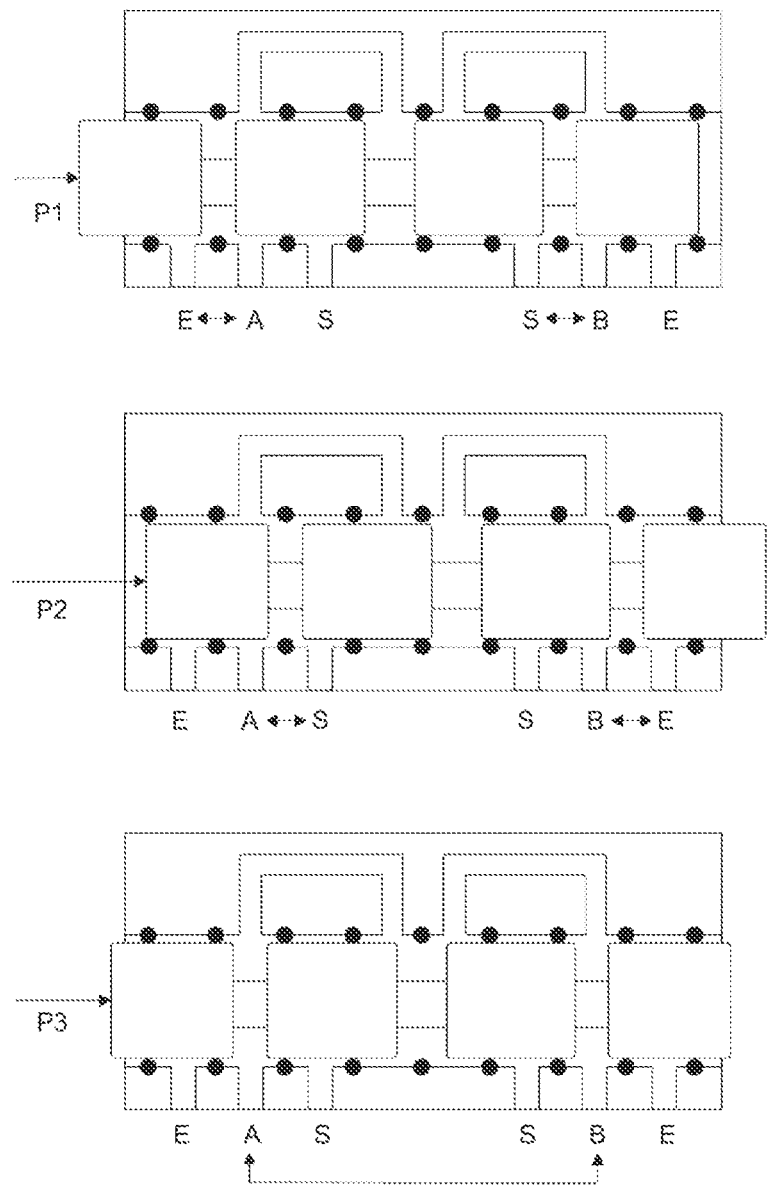
FIG. 7 depicts valve spool and body architecture for 8-port architecture of three-position directional control valve, where the third position connects exclusively both actuator ports (A and B), and isolates respectively the inlet and the exhaust ports (S and E).
Figure 8:
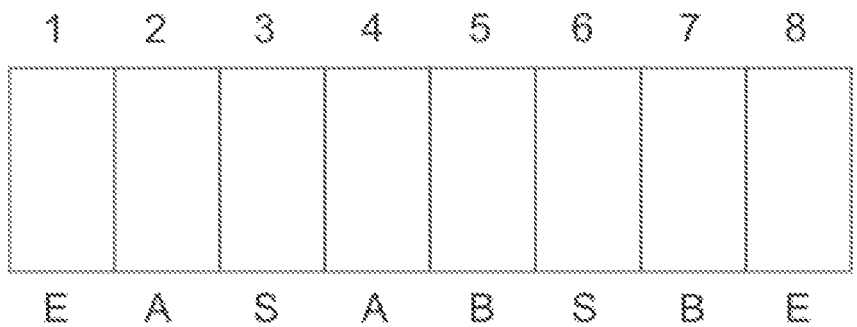
FIG. 8 depicts a schematic illustration of internal port configuration in 8-port valve design, showing the internal port number, along with the external port with which each internal port is associated.

A schematic of the 8-port directional control design is shown in FIG. 7. Note that the design includes 8 internal ports, as labeled in FIG. 8, arranged in the following order: exhaust port (E), first actuator port (A), inlet port (S), first actuator port (A), second actuator port (B), inlet port (S), second actuator port (B), and exhaust port (E). Given this port structure, the symmetric four-lobe valve spool shown (as opposed to the symmetric three-lobe spool in the standard configuration) can be incorporated into the valve body to provide the three-position connectivity previously described. The three spool positions corresponding to the first, second, and third valve positions are shown in FIG. 7, indicated in the figure as P1, P2, and P3 respectively. In order to maintain external port compatibility with the conventional 5-port design, internal flow paths can be introduced between second and fourth internal ports 2 and 4, and fifth and seventh internal ports 5 and 7, as shown in FIG. 7.

9-port Directional Control Valve Design

Figure 9:
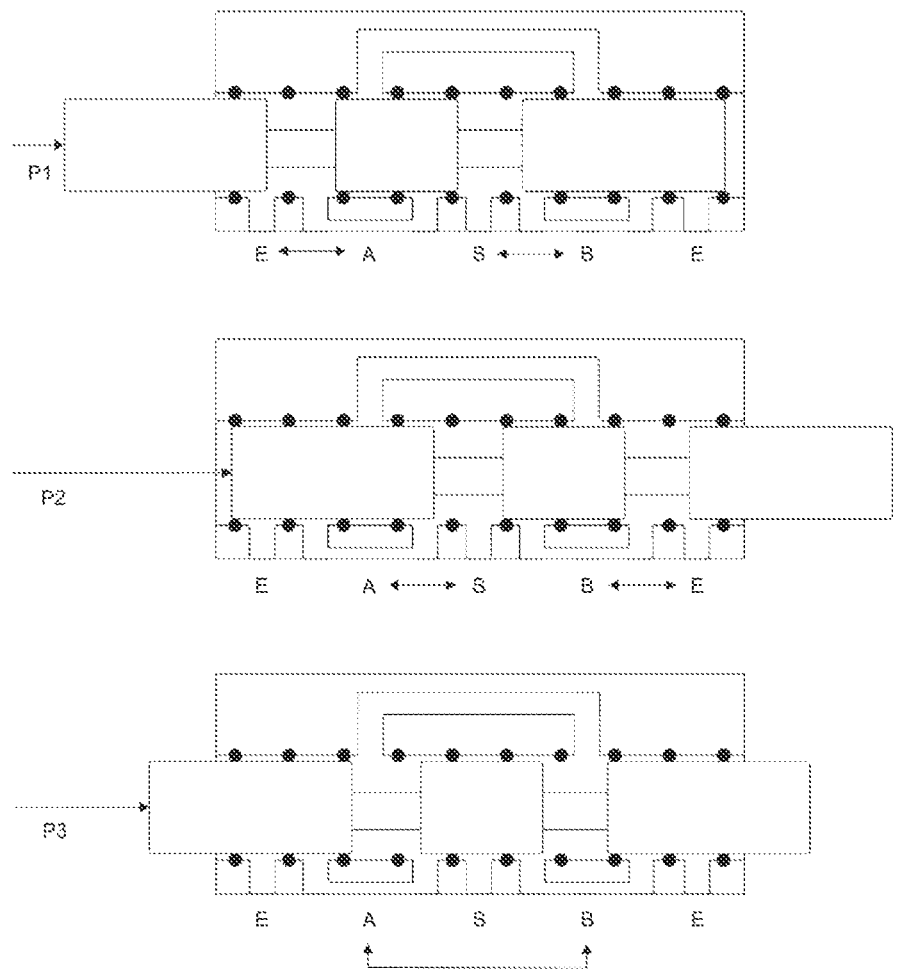
FIG. 9 depicts valve spool and body architecture for 9-port architecture of three-position directional control valve, where the third position connects exclusively both actuator ports (A and B), and isolates respectively the inlet and the exhaust ports (S and E).
Figure 10:
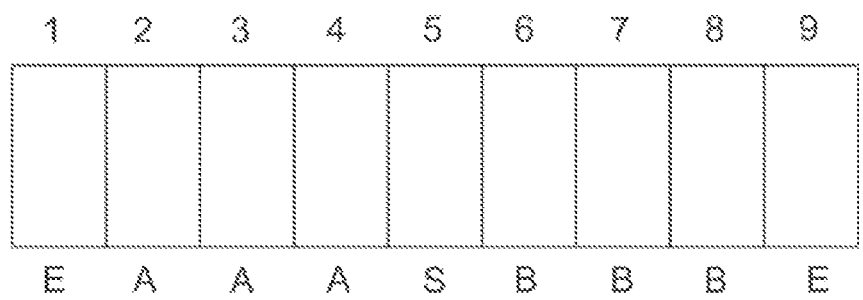
FIG. 10 depicts a schematic illustration of internal port configuration in 9-port valve design, showing the internal port number, along with the external port with which each internal port is associated.

A schematic of the 9-port directional control design is shown in FIG. 9. Note that the design includes 9 internal ports, as labeled in FIG. 10, arranged in the following order: exhaust port (E), first actuator port (A), first actuator port (A), first actuator port (A), inlet port (S), second actuator port (B), second actuator port (B), second actuator port (B), and exhaust port (E). Given this port structure, the symmetric three-lobe valve spool shown can be incorporated into the valve body to provide the three-position connectivity previously described. The three spool positions corresponding to the first, second, and third valve positions are shown in FIG. 9, indicated in the figure as P1, P2, and P3 respectively. In order to maintain external port compatibility with the conventional 5-port design, internal flow paths can be introduced between second and fourth internal ports 2 and 4, sixth and eighth internal ports 6 and 8, and third and seventh internal ports 3 and 7, as shown in FIG. 9.

In this disclosure, terms such as "right" and "left" are used for convenience and clarity with respect to the associated figures. It is understood by those skilled in the art, that such descriptions are not limiting, and that other exemplary embodiments may comprise other configurations (for example, vertical).

While exemplary embodiments are described herein, it will be understood that various modifications to the system and apparatus can be made without departing from the scope of the present invention. For example, the number of ports may be different in other embodiments.

The invention claimed is:

1. A directional-control valve comprising a valve spool within a valve body, wherein: the valve spool is configured to move within the valve body between a first position, a second position and a third position; the third valve spool position lies between the first and the second valve spool positions; and wherein the valve body comprises: five external ports arranged between a first end of the valve body and a second end of the valve body, comprising a first exhaust port, a first actuator port, an inlet port, a second actuator port, and a second exhaust port; further comprising a first internal port, a second internal port, a third internal port, a fourth internal port, a fifth internal port, a sixth internal port, a seventh internal port and an eighth internal port arranged in order between a first end of the valve body and a second end of the valve body, and wherein the first internal port is in fluid communication with the first exhaust port, the second internal port is in fluid communication with the first actuator port, the third internal port is in fluid communication with the inlet port, the fourth internal port is in fluid communication with the first actuator port, the fifth internal port is in fluid communication with the second actuator port, the sixth internal port is in fluid communication with the inlet port, the seventh internal port is in fluid communication with the second actuator port, and the eighth internal port is in fluid communication with the second exhaust port, and where the second and fourth internal ports, and the fifth and seventh internal ports, respectively, are in fluid communication.

2. The valve of claim 1, where the valve spool includes a first, second, third, and fourth lobe.

3. The valve of claim 2, where the four lobes are arranged in a symmetric manner along the length of the spool.

4. The valve of claim 3, where in the first spool position, the first and second internal ports maintain fluid communication between the first and second lobes of the spool; the third internal port is isolated from fluid communication by the second lobe of the spool; the fifth internal port is isolated from fluid communication by the third lobe of the spool; the sixth and seventh internal ports maintain fluid communication between the third and fourth lobes of the spool; and the eighth internal port is isolated from fluid communication by the fourth lobe of the spool.

5. The valve of claim 3, where in the second spool position, the first internal port is isolated from fluid communication by the first lobe of the spool; the second and third internal ports maintain fluid communication between the first and second lobes of the spool; the fourth internal port is isolated from fluid communication by the second lobe of the spool; the sixth internal port 6 isolated from fluid communication by the third lobe of the spool; and the seventh and eighth internal ports maintain fluid communication between the third and fourth lobes of the spool.

6. The valve of claim 3, where in the third spool position, the first internal port is isolated from fluid communication by the first lobe of the spool; the third internal port is isolated from fluid communication by the second lobe of the spool; the sixth internal port is isolated from fluid communication by the third lobe of the spool; the eighth internal port is isolated from fluid communication by the fourth lobe of the spool; and the fourth and fifth internal ports maintain fluid communication between the second and third lobes of the spool.

* * * * *